United States Patent Office 2,786,852
Patented Mar. 26, 1957

2,786,852

PROCESS OF PREPARING GAMMA-VALEROLACTONE

Andrew P. Dunlop, Riverside, and John W. Madden, Park Forest, Ill., assignors to The Quaker Oats Company, Chicago, Ill., a corporation of New Jersey No Drawing. Application August 19, 1953,
Serial No. 375,289

3 Claims. (Cl. 260—343.6)

This invention relates to a process for producing gamma-valerolactone and has for an object the provision of a process for making gamma-valerolactone by the hydrogenation of levulinic acid.

Gamma-valerolactone is known to be useful in industry for a number of purposes, such as a solvent for lacquers, insecticides and adhesives, and has also found some use in cutting oils, brake fluids and as coupling agents in dye baths. A number of processes have been suggested for the preparation of this compound. As a matter of fact, it is known in the prior art that gamma-valerolactone may be prepared by chemical reduction methods in the liquid phase. However, none of these processes lend themselves to commercial scale operations.

Accordingly, it is a further object of this invention to provide a process for the preparation of gamma-valerolactone in high yields from levulinic acid.

A further object of this invention is the provision of a continuous process for the production of gamma-valerolactone in high yields by the vapor phase hydrogenation of levulinic acid.

A still further object of this invention is the provision of a vapor phase hydrogenation process for the production of gamma-valerolactone which may be carried out at substantially atmospheric pressure utilizing conventional and inexpensive equipment.

A still further object of this invention is the provision of a process for hydrogenating levulinic acid to produce gamma-valerolactone under conditions which are easily controlled over a relatively wide temperature range.

Further and additional objects will appear from the following description and the appended claims.

In accordance with one embodiment of this invention, levulinic acid is converted to gamma-valerolactone in high yields by hydrogenating the levulinic acid in the vapor phase in the presence of a copper-containing catalyst. The copper catalyst is preferably a reduced copper oxide catalyst which may or may not contain chromium. The hydrogen is employed in large stoichiometric excess and unreacted hydrogen may be recycled to the conversion zone. The temperature of the reaction may be between about 150° and 300° C. but is preferably maintained within the range of 175° to 225° C. in order to obtain optimum yields. If desired, the catalyst may be used as such or may be supported on a suitable catalyst support, such as pumice, fuller's earth, infusorial earth, bauxite, or the like. The reaction is carried out at substantially atmospheric pressure so that no expensive pressurizing equipment is required. When optimum conversion conditions are employed, the gamma-valerolactone is produced in very high yields and may be separated from the water of reaction and other incidental impurities by means of fractional condensation or distillation.

For a more complete understanding of this invention, reference will now be made to several specific examples illustrating processes for carrying out this invention.

EXAMPLE 1

Six parts of powdered technical grade cupric oxide were triturated with four parts of a 40° Baumé aqueous solution of sodium silicate (water glass). The sodium silicate was of the type known as "N" and had an $Na_2O$ to $SiO_2$ ratio of 1:3.22 and contained 8.9% $Na_2O$ and 28.7% of $SiO_2$, the total solids content being 37.6%. The resulting black pasty mass was dried in an oven at about 78° C. for approximately 20 hours and then pulverized. After adding 0.1 part of flake graphite to the resulting powder as a mold lubricant, the mixture was compressed into cylindrical briquettes or pellets roughly ⅛ by ⅛ inch. The resulting product which contained approximately 80% CuO and 20% anhydrous sodium silicate was then heated in a stream of hydrogen to about 400° C. in order to reduce the copper oxide whereby the catalyst was activated for the hydrogenation procedure.

Levulinic acid was vaporized in a stream of hot hydrogen in the proportion of 0.5 gram for each five liters of hydrogen and the vaporous mixture was passed over the catalyst at a temperature of about 180° C. at the rate of about 5 liters per minute, the pressure being only about 1 to 5 p. s. i. g. to compensate for the pressure drop through the catalyst bed. The vaporous reaction product was then condensed and was found to contain gamma-valerolactone in an amount corresponding to 47% of the theoretical yield. This gamma-valerolactone was separated from water of reaction, any unreacted levulinic acid and any n-valeric acid by means of fractional distillation and the unreacted hydrogen was recycled to the conversion zone with additional levulinic acid. It is believed that the over-all recovery of gamma-valerolactone in this example was somewhat low due to the reaction of the levulinic acid with the sodium silicate contained within the catalyst.

EXAMPLE 2

A copper chromite catalyst was prepared by mixing solutions of copper nitrate and ammonium dichromate containing a slight excess of ammonia and in proportions to produce upon calcination a copper chromite catalyst containing 50% CuO and 50% $Cr_2O_3$. The resulting precipitate was filtered and dried to a free flowing powder at 70° to 100° C. It was thereafter decomposed by calcination, washed with acetic acid, dried and tableted as ⅛ inch pellets with a graphite lubricant. The resulting composition was then reduced with hydrogen at a temperature of about 400° C. in order to prepare the active catalyst. Thereafter a number of runs were made by passing a vaporous mixture of hydrogen and levulinic acid over the catalyst under the conditions mentioned in the previous example and as set forth in Table I.

Table I

YIELD OF GAMMA-VALEROLACTONE—50% CuO+50% $Cr_2O_3$ CATALYST

| Run No. | Temp. (° C.) | Feed Rate | | Yield of GVL (percent of theory) |
|---|---|---|---|---|
| | | Grams/min. of levulinic acid | Liters/min. of hydrogen | |
| 1 | 175 | 0.45 | 5 | 97 |
| 2 | 200 | 0.82 | 5 | 100 |
| 3 | 200 | 1.2 | 5 | 100 |
| 4 | 225 | 0.49 | 5 | 95 |
| 5 | 250 | 0.46 | 5 | 85 |
| 6 | 250 | 0.45 | 10 | 88 |

It will be noted that very high yields of gamma-valerolactone were obtained which in certain instances are substantially quantitative. The comparatively lower yields shown in runs 5 and 6 of Table I appear to be due to high temperatures which under the conditions of operation tend to favor the further reduction of the lactone to n-valeric acid.

EXAMPLE 3

A copper chromite catalyst containing 83.2% CuO and 16.3% $Cr_2O_3$ and a mold lubricant was prepared in essentially the same manner as indicated in Example 2. This catalyst was employed in the manner previously indicated and under the conditions set forth in Table II producing the indicated yields of gamma-valerolactone.

*Table II*

YIELD OF GAMMA-VALEROLACTONE—83.2% CuO+16.3% $Cr_2O_3$

| Run No. | Temp. (°C.) | Feed Rate | | Yield of GVL (percent of theory) |
|---|---|---|---|---|
| | | Grams/ min. of levulinic acid | Liters/ min. of hydrogen | |
| 7 | 175 | 0.83 | 5 | 43 |
| 8 | 200 | 0.81 | 5 | 93 |
| 10 | 250 | 0.83 | 5 | 85 |

It will be noted that a comparatively low yield was obtained in run No. 7, this being due largely to the presence in the reaction products of unreacted levulinic acid. This may be compensated for by raising the temperature of the reaction or increasing the contact time.

EXAMPLE 4

A catalyst was prepared by pelleting black cupric oxide with 4% graphite as a lubricant. The resulting pellets were reduced in the presence of hydrogen gas as before indicated and a hot vaporous mixture of levulinic acid in hydrogen was passed thereover. The flow of vaporous levulinic acid was at the rate of 0.8 gram per minute while the flow of hydrogen was at the rate of 5 liters per minute. It was found that the yield of gamma-valerolactone was about 93% of theory.

It will be apparent from the foregoing considerations that an inexpensive procedure has been developed for producing gamma-valerolactone directly from levulinic acid utilizing a continuous vapor phase procedure in the presence of a copper-containing catalyst. High yields of the desired product are obtained and the process is particularly suitable for use in commercial operations.

While particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A process of preparing gamma-valerolactone which comprises passing a mixture of hydrogen and levulinic acid in the vapor state over a reduced copper oxide catalyst at a temperature between about 175° and about 225° C.

2. The process recited in claim 1 wherein the mixture is passed over the catalyst at substantially atmospheric pressure.

3. A continuous process of preparing gamma-valerolactone which comprises passing a mixture of hydrogen and levulinic acid in the vapor state at substantially atmospheric pressure over a reduced copper chromite catalyst in a reaction zone maintained at a temperature between about 175° and about 225° C., continuously withdrawing a vaporous mixture from said reaction zone, and cooling the withdrawn mixture whereby to condense the desired product.

References Cited in the file of this patent
UNITED STATES PATENTS

| | | |
|---|---|---|
| 1,964,000 | Lazier | June 26, 1934 |
| 2,129,507 | Salzberg | Sept. 6, 1938 |
| 2,368,366 | Kyrides | Jan. 30, 1945 |

OTHER REFERENCES

Sabatier et al.: Ann. chim. phys. [8] 16, 70–77 (1909).
Schuette et al.: J. A. C. S. 52, 3010–3012 (1930)
Christian et al.: J. A. C. S. 69, 1961–1963 (1947)
Chaikin et al.: J. A. C. S. 71, 122–5 (1949)
Allen et al.: J. A. C. S. 61, 843–6 (1939)
Berkenheim et al: Chem. Abst., vol. 34, col. 368 (1940).
Sasaki et al.: Chem. Abst., vol. 43, col. 5367 (1949).